(12) United States Patent
Pliss et al.

(10) Patent No.: US 7,296,044 B1
(45) Date of Patent: Nov. 13, 2007

(54) METHOD AND APPARATUS FOR KEEPING TRACK OF MEMORY USAGE FOR TASKS IN A SHARED HEAP

(75) Inventors: Oleg A. Pliss, Santa Clara, CA (US); Bernd J. W. Mathiske, Cupertino, CA (US); Kinsley Wong, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 379 days.

(21) Appl. No.: 11/020,966

(22) Filed: Dec. 22, 2004

Related U.S. Application Data

(63) Continuation-in-part of application No. 10/866,046, filed on Jun. 10, 2004, now Pat. No. 7,171,527.

(51) Int. Cl.
*G06F 12/00* (2006.01)
*G06F 17/30* (2006.01)

(52) U.S. Cl. .................. 707/206; 707/205; 711/170; 711/147

(58) Field of Classification Search .............. None
See application file for complete search history.

(56) References Cited

U.S. PATENT DOCUMENTS

| | | | | |
|---|---|---|---|---|
| 6,185,581 | B1 * | 2/2001 | Garthwaite | 707/206 |
| 6,560,619 | B1 * | 5/2003 | Flood et al. | 707/206 |
| 7,171,527 | B2 * | 1/2007 | Pliss et al. | 711/153 |
| 2003/0196061 | A1 * | 10/2003 | Kawahara et al. | 711/170 |

\* cited by examiner

*Primary Examiner*—Gary Portka
*Assistant Examiner*—Gary W Cygiel
(74) *Attorney, Agent, or Firm*—Park, Vaughan & Fleming LLP; Edward J. Grundler

(57) ABSTRACT

One embodiment of the present invention provides a system that facilitates keeping track of memory usage of tasks in a shared heap. The system operates by performing a garbage collection operation on the shared heap, wherein the garbage collection operation is a compacting garbage collection operation which preserves the ordering of objects within the shared heap. The system determines a memory usage for each task in the shared heap by adding the memory usage for intervals containing objects for each task in the shared heap to the memory usage count for each task to produce an actual memory usage for each task. This garbage collection may or may not be a generational garbage collection operation.

21 Claims, 6 Drawing Sheets

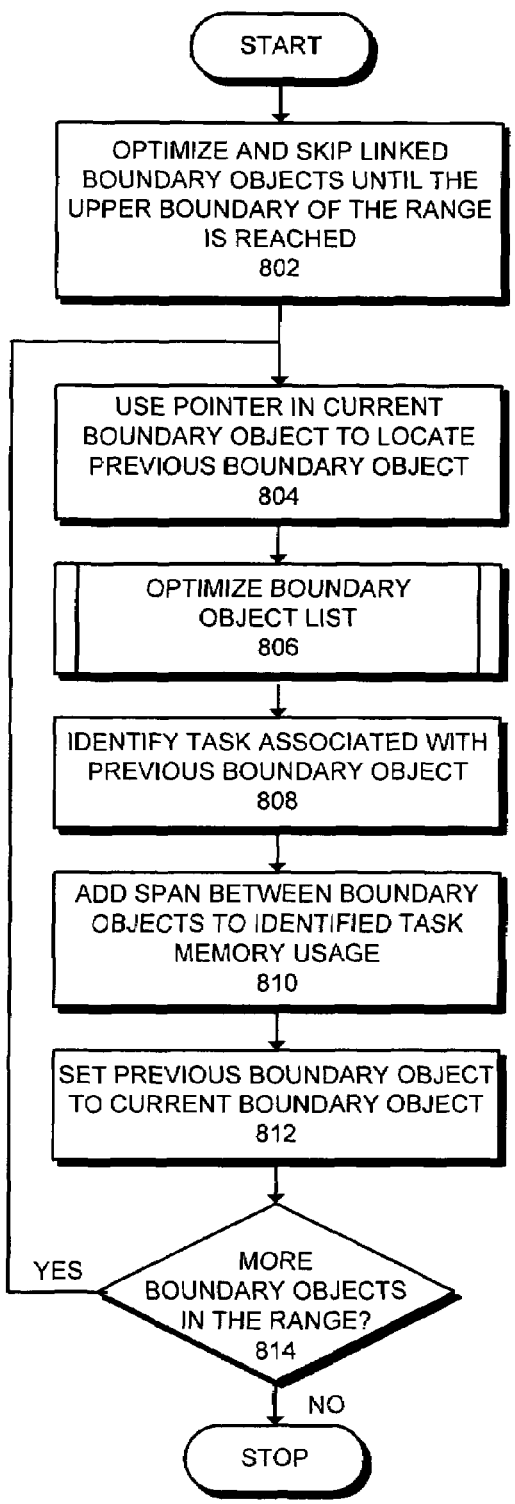
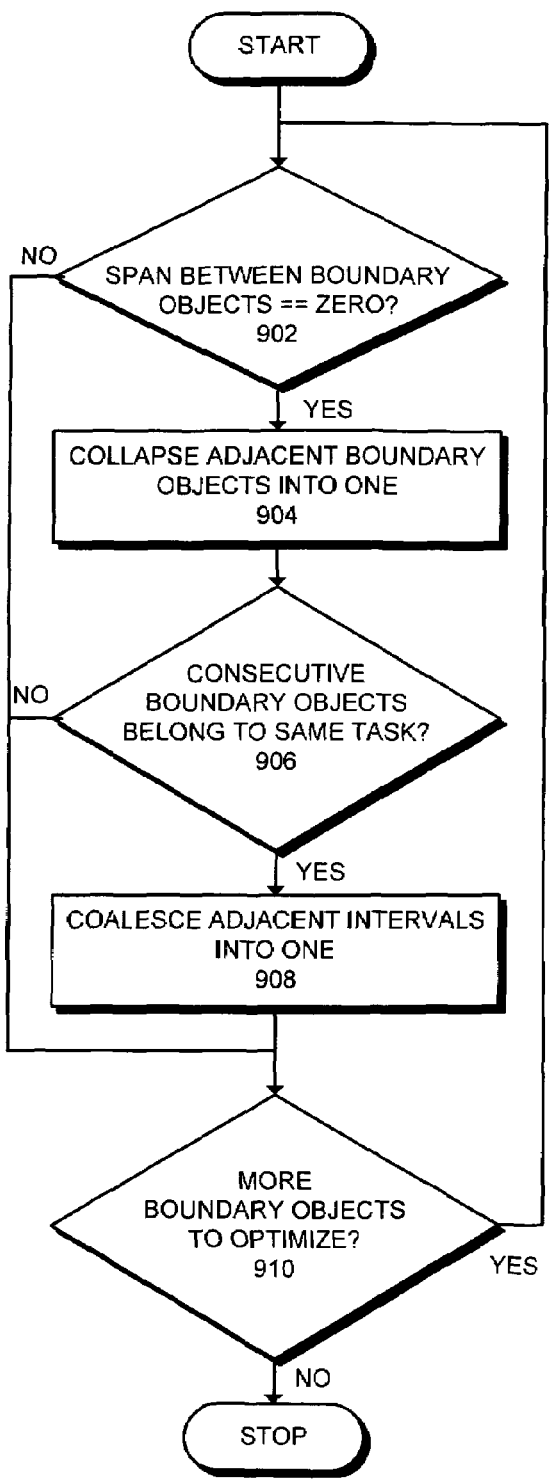
FIG. 8    FIG. 9

METHOD AND APPARATUS FOR KEEPING TRACK OF MEMORY USAGE FOR TASKS IN A SHARED HEAP

RELATED APPLICATION

The present application is a continuation-in-part of, and hereby claims priority under 35 U.S.C. § 120 to, U.S. patent application Ser. No. 10/866,046 filed on 10 Jun. 2004 now U.S. Pat. No. 7,171,527 by inventors Oleg A. Pliss, Bernd J. Mathiske, Ioi K. Lam, and Vijay G. Nagarajan, entitled "Method and Apparatus for Keeping Track of Memory Usage for Tasks in a Shared Heap".

BACKGROUND

1. Field of the Invention

The present invention relates to virtual machines within computer systems. More specifically, the present invention relates to a method and an apparatus for keeping track of memory usage for tasks in a shared heap without performing a full garbage-collection operation.

2. Related Art

The Java 2 Platform, Micro Edition (J2ME™), has become very popular in the wireless device space. Motorola, Nokia, NTT DoCoMo, RIM, Siemens, and many other key players in the wireless device industry have recently started shipping J2ME-enabled devices in very high volume. It has been estimated that over 200 million J2ME-enabled mobile phones were shipped in 2003 alone.

In order to effectively run applications on the new memory-constrained computing devices, a number of techniques have been developed to conserve memory. One promising technique involves providing a shared heap wherein objects from different tasks can be stored. This can greatly save memory space in comparison to the conventional technique of providing a separate heap for each thread. However, this shared heap technique complicates both garbage-collection operations and memory accounting operations.

In traditional non-memory-constrained computing systems, additional data structures, such as lookup tables, can be used to keep track of memory allocation by individual tasks. However, in memory-constrained computing devices, memory is extremely scarce. It is consequently impractical to use additional data structures to keep track of memory allocation, because the additional space used by the data structures would largely eliminate the space savings gained by using a shared heap.

Hence, what is needed is a method and an apparatus for keeping track of memory usage for tasks in a shared heap without the problems listed above.

SUMMARY

One embodiment of the present invention provides a system that facilitates keeping track of memory usage of tasks in a shared heap. The system operates by performing a garbage collection operation on the shared heap, wherein the garbage collection operation is a compacting garbage collection operation which preserves the ordering of objects within the shared heap. The system determines a memory usage for each task in the shared heap by adding the memory usage for intervals containing objects for each task in the shared heap to the memory usage count for each task to produce an actual memory usage for each task. This garbage collection may or may not be a generational garbage collection operation.

In a variation on this embodiment, intervals of objects for each task are delimited by boundary marker objects.

In a further variation, the boundary marker includes a pointer to a previous boundary marker.

In a further variation, the boundary marker identifies a task to which the subsequent interval of objects belongs.

In a variation on this embodiment, the system collapses zero use intervals between boundary markers.

In a further variation, the system coalesces consecutive intervals that belong to the same task.

In a variation on this embodiment, the system performs a minor garbage collection on the shared heap on only new objects which have appeared in the shared heap since the last major garbage collection. The system adds the memory usage for the new objects in the shared heap to the global memory usage for each task.

In a variation on this embodiment, the shared heap is located within a memory-constrained computing device.

In a variation on this embodiment, the shared heap is located within a platform-independent virtual machine.

In a further variation, the platform-independent virtual machine is a JAVA Virtual Machine.

BRIEF DESCRIPTION OF THE FIGURES

FIG. 8 presents a flowchart illustrating accumulating task memory usage in a given range in accordance with an embodiment of the present invention.

FIG. 9 presents a flowchart illustrating the process of removing unneeded boundary objects in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Memory-Constrained Computing Device with a Shared Heap

Figure 1:
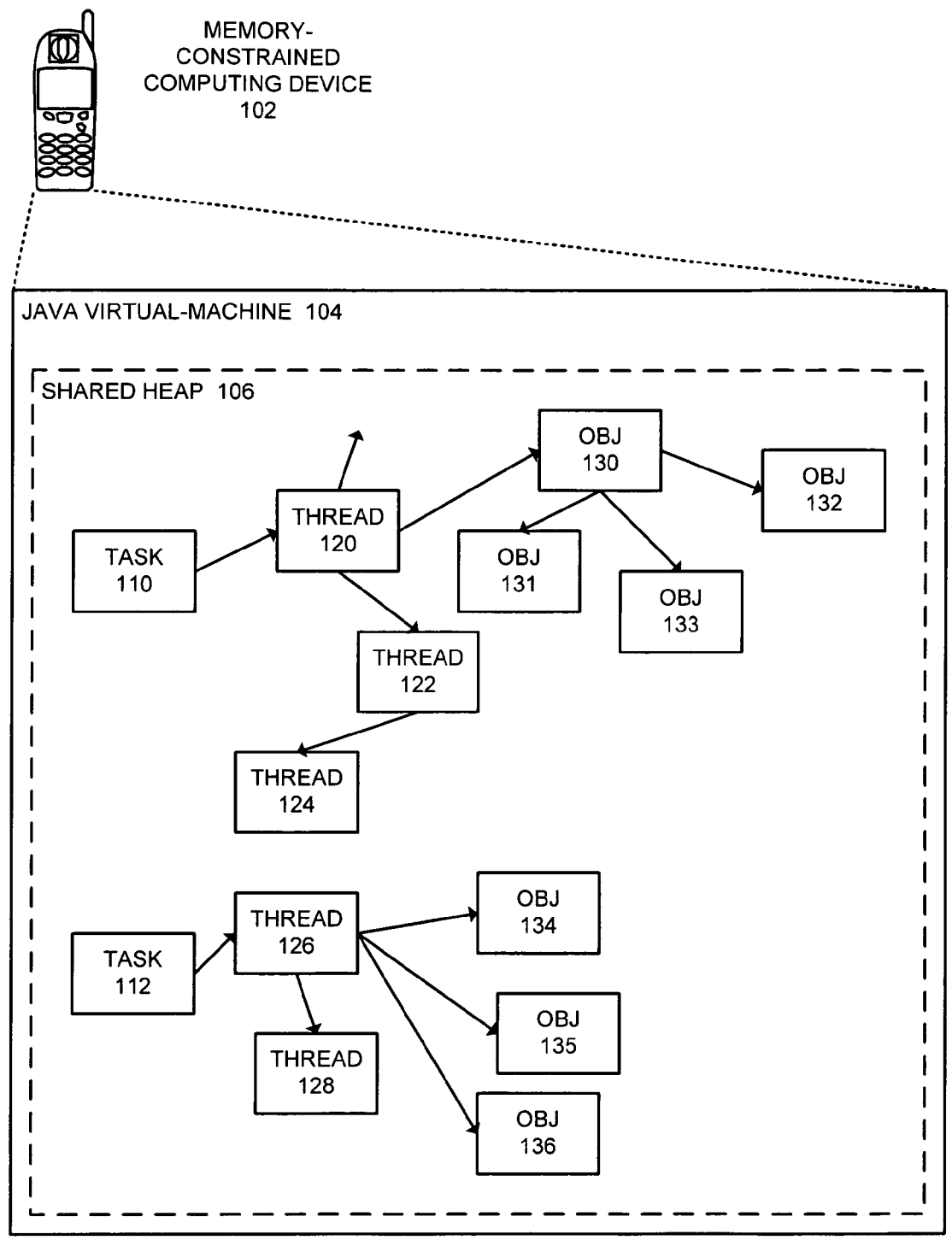
FIG. 1 illustrates a memory-constrained computing device with a shared heap in accordance with an embodiment of the present invention.

FIG. 1 illustrates a memory-constrained computing device 102 with a shared heap in accordance with an embodiment of the present invention. Memory-constrained computing device 102 can include any type of computing device, including, but not limited to, a cell phone, a computer system based on a microprocessor, a digital signal processor, a portable computing device, a personal organizer, a device controller, and a computational engine within an appliance. Memory-constrained computing device 102 contains Java Virtual Machine (JVM) 104, which in turn contains shared heap 106. (The terms JAVA, JVM, and JAVA VIRTUAL MACHINE are trademarks of SUN Microsystems, Inc. of Santa Clara, Calif.) Note that JVM 104 could be any type of platform-independent virtual machine, and is not meant to be limited to a Java Virtual Machine.

Shared heap 106 includes all of the tasks running on JVM 104, as well as the associated threads and objects. For example, in the illustrated embodiment, shared heap 106 includes task 110, and associated threads 120-124. Likewise, shared heap 106 also includes task 112, and associated threads 126-128. In addition, shared heap 106 includes objects 130-136 that are associated with the various threads.

Generational Shared Heap

Figure 2:
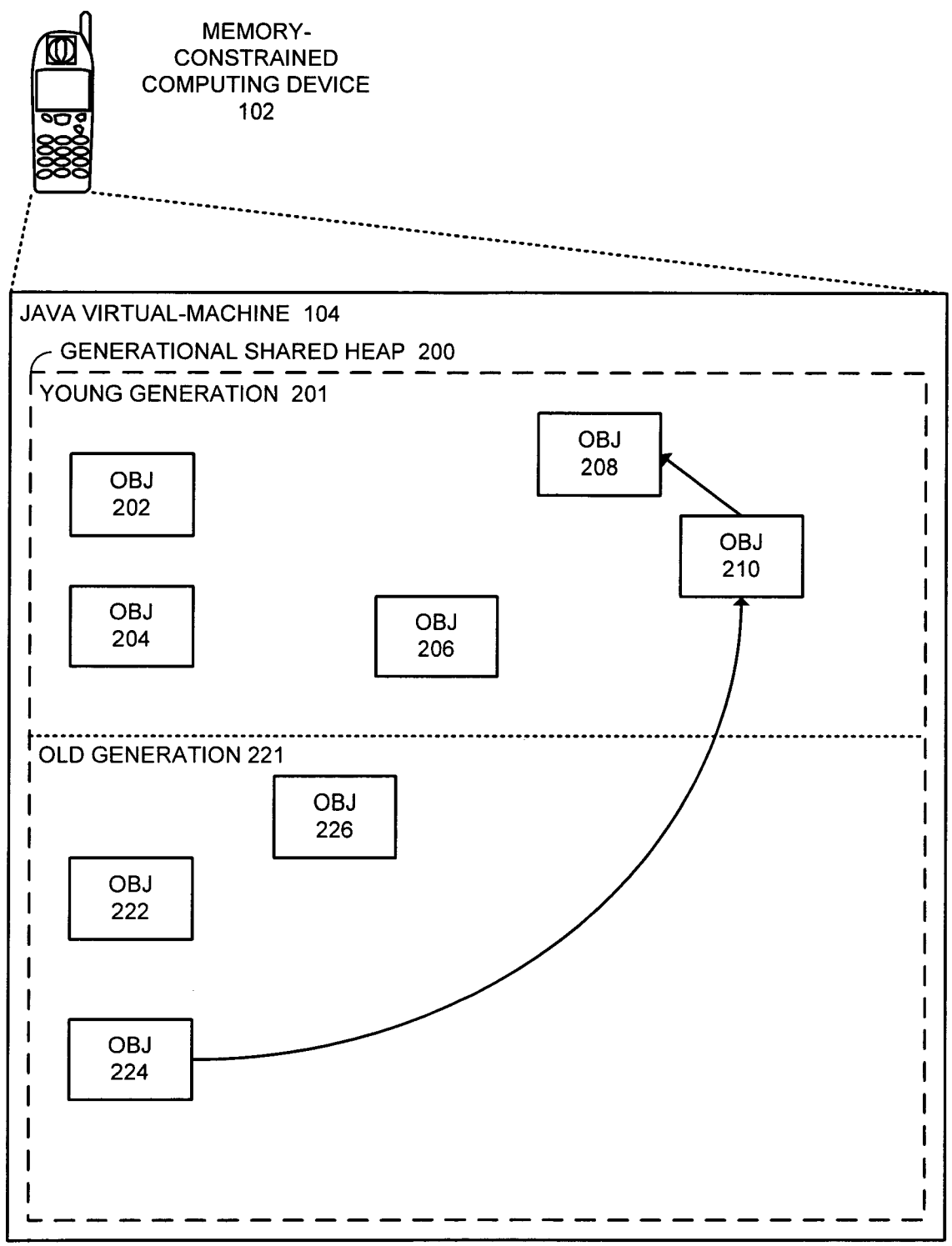
FIG. 2 illustrates a generational shared heap in accordance with an embodiment of the present invention.

FIG. 2 illustrates a generational shared heap 200 in accordance with an embodiment of the present invention. Note that generational shared heap 200 is partitioned into young generation 201 and old generation 221. In the example illustrated in FIG. 2, generational shared heap 200 is partitioned into two generations. However, generational shared heap 200 may be partitioned into any number of generations.

As objects are allocated to generational shared heap 200, they are allocated in young generation 201. During subsequent garbage-collection operations, live objects in the young generation 201, such as objects 202-210, are promoted to old generation 221, and young generation 201 is available for subsequent allocation operations. Additionally, pointers that point to the objects that are being promoted need to be updated, such as object 224. Occasionally, it becomes necessary to perform a full garbage-collection operation, including old generation 221, to free space occupied by objects that are no longer live. Note that various techniques for garbage collection exist. Any of these techniques, generational or not, which preserve ordering of the objects can be used with the present invention.

Boundary Objects

Figure 3:
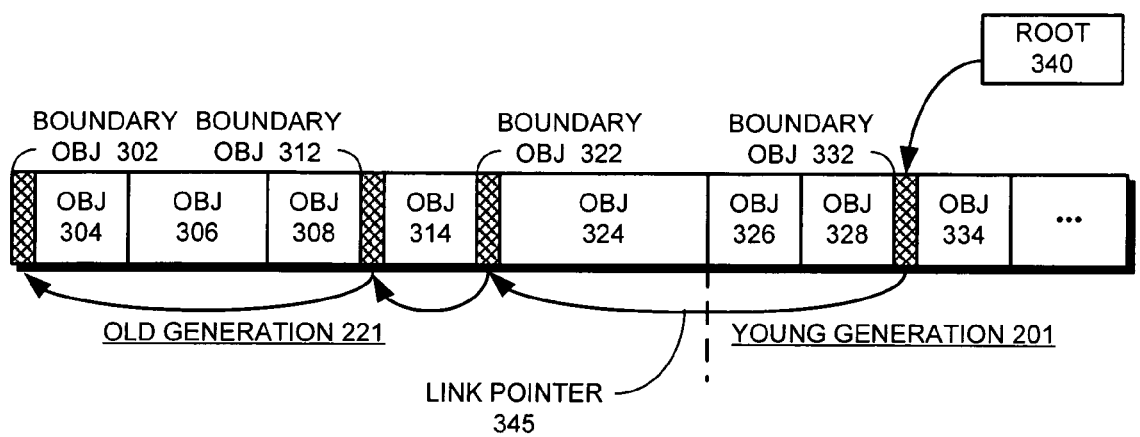
FIG. 3 illustrates boundary objects in accordance with an embodiment of the present invention.

In order to keep track of which objects are owned by which tasks, one embodiment of the present invention illustrated in FIG. 3 utilizes boundary objects. In this example, objects that are promoted to old generation 221 are ordered consecutively from the beginning of the heap, and are followed by objects that are newly allocated in young generation 201. A compacting garbage collector ensures that the order of remaining objects remains the same during garbage collection.

When objects are allocated to young generation 201, the first object that is allocated is a boundary object, such as boundary object 302. Boundary objects are ideally the minimum size possible that can accommodate an identifier for the task that owns the objects following the boundary object and a pointer to a previous boundary object. Once the boundary object is allocated, objects are allocated for the task in consecutive memory locations following the boundary object. For example, objects 304-308 are owned by the task identified by boundary object 302, object 314 is owned by the task identified by boundary object 312, objects 324-328 are owned by the task identified by boundary object 322, and object 334 is owned by the task identified by boundary object 332. The system also includes a root pointer 340, which points to the last boundary object—boundary object 332.

If the system needs to allocate additional objects for a given task (which the system has already allocated objects for), and the system has most recently allocated objects for other tasks, the system can allocate an additional boundary object identifying the given task, and can then allocate the additional objects following the additional boundary object. For example, objects 304-308 may belong to task number one as identified by boundary object 302. Additionally, objects 324-328 may also belong to task number one as identified by boundary object 322, even though they are separated from objects 304-308 by intervening objects. In this way, the system does not have to allocate extra space for the given task in anticipation of subsequent requirements for the given task, (as is necessary in most current systems).

During a major garbage collection operation, objects that have been in young generation 201 for a given time are promoted to old generation 221. This is accomplished by moving the boundary between old generation 221 and young generation 201 so that the objects are promoted.

"Link pointers" within the boundary objects point to immediately preceding boundary object. For example, link pointer 345 within boundary object 332 points to boundary object 322. Likewise, a link pointer within boundary object 322 points to boundary object 312, and a link pointer within boundary object 312 points to boundary object 302.

Exemplary Boundary Object

Figure 4:
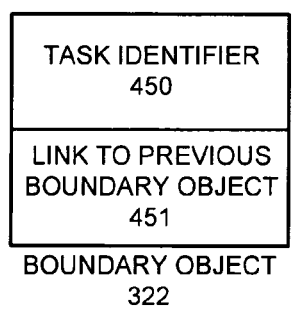
FIG. 4 illustrates a boundary object in accordance with an embodiment of the present invention.

FIG. 4 illustrates an exemplary boundary object 322 in accordance with an embodiment of the present invention. Boundary object 322 includes task identifier 450 and a link to a previous boundary object 451. Task identifier 450 identifies the task owning the objects immediately following boundary object 322 up to the next boundary object—boundary object 332. The link to previous boundary object 451 contains the memory address of the previous boundary object—boundary object 312.

Object Allocation

Figure 5:
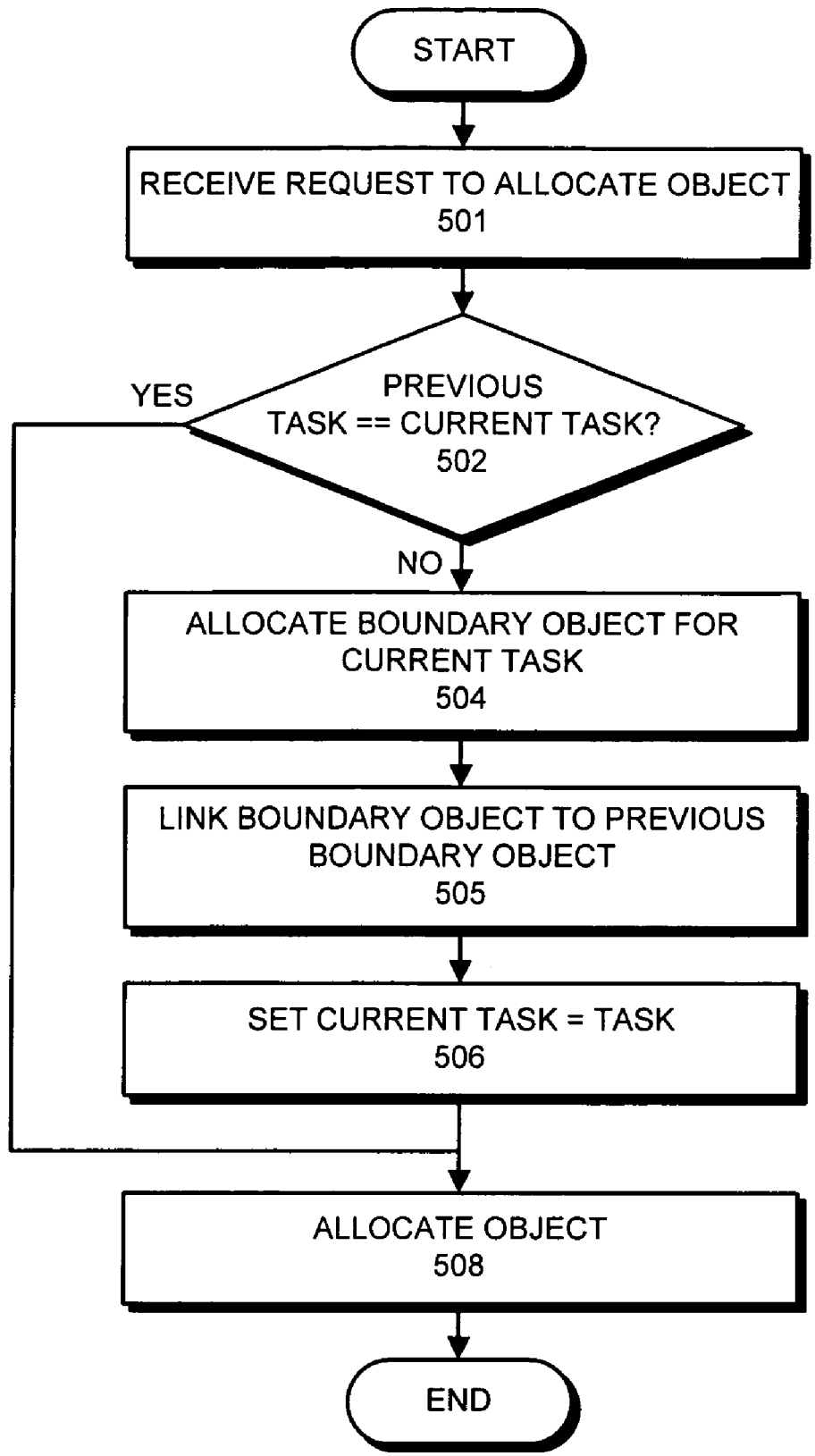
FIG. 5 presents a flowchart illustrating the process of object allocation in the young generation in accordance with an embodiment of the present invention.

FIG. 5 presents a flowchart illustrating the process of object allocation in young generation 201 in accordance with an embodiment of the present invention. The system starts by receiving a request from JVM 104 to allocate an object for a current task (step 501). Next, the system checks to see if the current task is the same as a previous task for the last object allocation (step 502). If so, the system skips to step 508 and allocates the object.

However, if the current task is not the same as the previous task, the system allocates a boundary object with an identifier for the current task (step 504) and links the boundary object with the previous boundary object (step 505). The system also sets the current task indicator to match the current task to facilitate future object allocations (step 506). The system then allocates the object (step 508).

Determining Memory Usage

Figure 6:
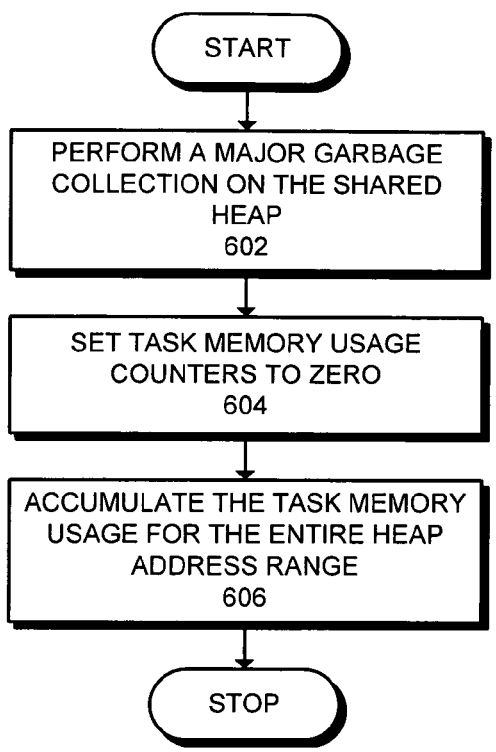
FIG. 6 presents a flowchart illustrating determining the memory usage for each task in accordance with an embodiment of the present invention.

FIG. 6 presents a flowchart illustrating determining the memory usage for each task in accordance with an embodiment of the present invention. The system starts by performing a major garbage collection on the shared heap (step 602). This major garbage collection is a compacting garbage collection, which maintains the order of live objects on the shared heap. Next, the system sets the task memory counters to zero for each task (step 604). Finally, the system accumulates the task memory usage for the entire heap address range (step 606).

Accumulating Promoted Object Task Memory Usage

Figure 7:
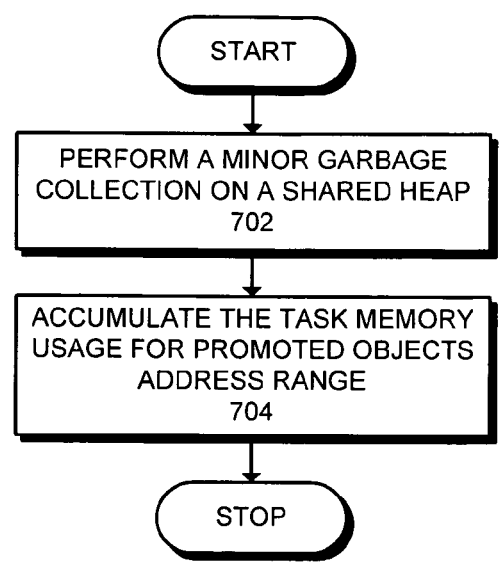
FIG. 7 presents a flowchart illustrating accumulating task memory usage for promoted objects in accordance with an embodiment of the present invention.

FIG. 7 presents a flowchart illustrating accumulating task memory usage for promoted objects in accordance with an embodiment of the present invention. The system starts by performing a minor garbage collection (step 702). Next, the system accumulates the task memory usage for the promoted objects address range (step 704). This process updates the task memory usage without having to accumulate the task memory usage for the entire heap address range.

One embodiment of the present invention provides a system for keeping track of memory usage of tasks in a shared heap. In one embodiment of the present invention, the system includes a garbage collection mechanism, a determining mechanism, and an adding mechanism. In one embodiment, the garbage collection mechanism is configured to perform a garbage collection on a shared heap, wherein the garbage collection is a compacting garbage collection which preserves an ordering of objects within the shared heap. In one embodiment, the determining mechanism is configured to determine a memory usage by each task in the shared heap. In one embodiment, the adding mechanism is configured to add the memory usage for intervals containing objects for each task in the shared heap to a memory usage count for each task to produce an actual memory usage for each task.

Accumulating Task Memory Usage in a Given Range

FIG. 8 presents a flowchart illustrating accumulating task memory usage in a given range in accordance with an embodiment of the present invention. The system starts optimizing and skipping linked boundary objects until the upper boundary of the range is reached (step 802). Old objects were in the old generation before the garbage collection. Promoted objects were moved to the old generation as a result of the collection. Old objects together with promoted objects constitute then old generation after the collection. Some objects may be retained in the young generation as they are not mature enough for the promotion.

At the start of a loop, the system uses the pointer in the current boundary object to locate the previous boundary object (step 804). After locating the previous boundary object, the system optimizes the boundary object list by removing unneeded boundary objects (step 806). Removing unneeded boundary objects is described below in conjunction with FIG. 9. Next, the system identifies the task associated with the previous boundary object (step 808). The system then adds the span, or memory used, between the current boundary object and the previous boundary object to the memory usage for the task identified in step 808 (step 810).

To continue the loop, the system sets the previous boundary object to be the current boundary object (step 812). The system then determines if there are more boundary objects in the range (step 814). If so, the system returns to step 804 to continue determining the memory usage. Otherwise, the memory usage has been determined and the process is complete.

Removing Unneeded Boundary Objects

FIG. 9 presents a flowchart illustrating the process of removing unneeded boundary objects in accordance with an embodiment of the present invention. The system starts when the span between boundary objects is equal to zero (step 902). If the span is zero, the system collapses the adjacent boundary objects into a single boundary object (step 904).

After collapsing the boundary objects, the system determines if consecutive boundary objects belong to the same task (step 906). If so, the system coalesces adjacent intervals into a single interval (step 908). After coalescing the adjacent intervals at step 908, or if the consecutive intervals do not belong to the same task at step 906, or if the span is not zero at step 902, the system determines if there are more boundary objects to optimize in the given range (step 910). If so, the process returns to step 902 to continue removing the unneeded boundary objects. Otherwise, the process is terminated.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for keeping track of memory usage of tasks in a shared heap, comprising:
    performing a garbage collection on the shared heap, wherein the garbage collection is a compacting garbage collection which preserves an ordering of objects within the shared heap;
    determining a memory usage by each task in the shared heap; and
    adding the memory usage for intervals containing objects for each task in the shared heap to a memory usage count for each task to produce an actual memory usage for each task.

2. The method of claim 1, wherein identifying the task that owns the object involves finding an object that is a boundary marker, wherein a boundary marker acts as a delimiter separating objects belonging to different tasks, wherein the object is owned by the task that is identified by the last boundary marker preceding the object.

3. The method of claim 2, wherein the boundary marker includes a pointer to a previous boundary marker.

4. The method of claim 3, wherein determining the memory usage for a task involves computing the distance between an address of the boundary marker and the address of the previous boundary marker.

5. The method of claim 2, further comprising collapsing zero use intervals between boundary markers.

6. The method of claim 2, further comprising coalescing consecutive intervals that belong to the same task.

7. The method of claim 1, further comprising:
performing a minor garbage collection on the shared heap, wherein the minor garbage collection is performed on new objects which have appeared in the shared heap since the last major garbage collection; and
adding the memory usage for the new objects to the global memory usage for each task.

8. The method of claim 1, wherein the shared heap is located within a memory-constrained computing device.

9. The method of claim 1, wherein the shared heap is located within a platform-independent virtual machine.

10. The method of claim 9, wherein the platform-independent virtual machine is a JAVA Virtual Machine.

11. A computer-readable storage medium storing instructions that when executed by a computer cause the computer to perform a method for keeping track of memory usage of tasks in a shared heap, wherein the computer-readable storage medium includes any device or medium that can store code and/or data for use by a computer system, including, but not limited to, magnetic and optical storage devices, but which does not include computer instruction signals embodied in a transmission medium, and wherein the method comprises:
performing a garbage collection on the shared heap, wherein the garbage collection is a compacting garbage collection which preserves an ordering of objects within the shared heap;
determining a memory usage by each task in the shared heap; and
adding the memory usage for intervals containing objects for each task in the shared heap to a memory usage count for each task to produce an actual memory usage for each task.

12. The computer-readable storage medium of claim 11, wherein identifying the task that owns the object involves finding an object that is a boundary marker, wherein a boundary marker acts as a delimiter separating objects belonging to different tasks, wherein the object is owned by the task that is identified by the last boundary marker preceding the object.

13. The computer-readable storage medium of claim 12, wherein the boundary marker includes a pointer to a previous boundary marker.

14. The computer-readable storage medium of claim 13, wherein determining the memory usage for a task involves computing the distance between an address of the boundary marker and the address of the previous boundary marker.

15. The computer-readable storage medium of claim 12, the method further comprising collapsing zero use intervals between boundary markers.

16. The computer-readable storage medium of claim 12, the method further comprising coalescing consecutive intervals that belong to the same task.

17. The computer-readable storage medium of claim 11, the method further comprising:
performing a minor garbage collection on the shared heap, wherein the minor garbage collection is performed on new objects which have appeared in the shared heap since the last major garbage collection; and
adding the memory usage for the new objects to the global memory usage for each task.

18. The computer-readable storage medium of claim 11, wherein the shared heap is located within a memory-constrained computing device.

19. The computer-readable storage medium of claim 11, wherein the shared heap is located within a platform-independent virtual machine.

20. The computer-readable storage medium of claim 19, wherein the platform-independent virtual machine is a JAVA Virtual Machine.

21. An apparatus for keeping track of memory usage of tasks in a shared heap, comprising:
a processor which includes:
a garbage collection mechanism configured to perform a garbage collection on the shared heap, wherein the garbage collection is a compacting garbage collection which preserves an ordering of objects within the shared heap;
a determining mechanism configured to determine a memory usage by each task in the shared heap; and
an adding mechanism configured to add the memory usage for intervals containing objects for each task in the shared heap to a memory usage count for each task to produce an actual memory usage for each task.

* * * * *